(12) United States Patent
Draghetti et al.

(10) Patent No.: US 7,117,872 B2
(45) Date of Patent: Oct. 10, 2006

(54) METHOD AND A DEVICE FOR MANAGING THE SUPPLY OF WRAPPING AND/OR ADDITIONAL AND/OR AUXILIARY MATERIALS IN A SYSTEM FOR THE MANUFACTURE OF TOBACCO PRODUCTS

(75) Inventors: Fiorenzo Draghetti, Medicina (IT); Stefano Romagnoli, Casalecchio di Reno (IT); Danilo Berti, Bologna (IT); Gaetano De Pietra, Casalecchio di Reno (IT); Cristina Pareschi, Ferrara (IT)

(73) Assignee: G.D S.p.A., Bologna (IT)

( * ) Notice: Subject to any disclaimer, the term of this patent is extended or adjusted under 35 U.S.C. 154(b) by 506 days.

(21) Appl. No.: 10/391,571

(22) Filed: Mar. 20, 2003

(65) Prior Publication Data

US 2003/0178037 A1   Sep. 25, 2003

(30) Foreign Application Priority Data

Mar. 21, 2002 (IT) .......................... BO2002A0139

(51) Int. Cl.
*A21C 5/32* (2006.01)
(52) U.S. Cl. ...................... 131/280; 131/910; 131/283
(58) Field of Classification Search ................ 131/283, 131/58, 280, 94, 910; 53/52, 396, 44; 198/347.1, 198/571, 572
See application file for complete search history.

(56) References Cited

U.S. PATENT DOCUMENTS 4,030,511 A * 6/1977 Wahle ........................ 131/280
4,962,840 A * 10/1990 Miura et al. .............. 198/347.1
5,284,164 A    2/1994 Andrews et al.
5,914,878 A    6/1999 Yamamoto et al.
6,516,811 B1 * 2/2003 Focke et al. ................. 131/283

FOREIGN PATENT DOCUMENTS

| EP | 1041006 | 10/2000 |
|---|---|---|
| EP | 1193196 | 4/2002 |
| WO | 0016647 | 3/2000 |
| WO | 0166442 | 9/2001 |

* cited by examiner

*Primary Examiner*—Dionne W. Mayes
(74) *Attorney, Agent, or Firm*—Timothy J. Klima

(57) ABSTRACT

The supply of consumables and other materials to production machines in a system for the manufacture of tobacco products is managed using a method whereby, once a nominal target number of products has been programmed at a master control unit, a tally is kept of the number of products emerging from the machine located farthest downstream, and a corresponding signal relayed back to the master control unit, together with a signal indicating the consumption of the various types of material. On the basis of the information received, the master control unit will process an output message indicating the requirement for at least one given type of consumable or wrapping or other auxiliary material to be supplied, whereupon the message is sent to an operator entrusted with the task of replacing the depleted material.

18 Claims, 6 Drawing Sheets

METHOD AND A DEVICE FOR MANAGING THE SUPPLY OF WRAPPING AND/OR ADDITIONAL AND/OR AUXILIARY MATERIALS IN A SYSTEM FOR THE MANUFACTURE OF TOBACCO PRODUCTS

BACKGROUND OF THE INVENTION

The present invention relates to a method and a device for managing the supply of wrapping and/or additional and/or auxiliary materials in a system for the manufacture of tobacco products.

Manufacturing systems for tobacco products generally comprise a plurality of machines linked one to another along a common production line. In particular, such machines will include a cigarette maker at the upstream end of the line and, arranged in succession proceeding toward the downstream end, a filter tip attachment, a packer, a cellophaner, a cartoner and finally a machine by which pluralities of cartons are packed into boxes and transferred to an end-of-line palletizer, ready for dispatch. The system may also comprise a temporary storage unit of variable capacity associated with one or more of the machines, serving to compensate any differences in operating speeds, and possibly a filter plug maker associated with the filter tip attachment.

In systems of the type in question, each machine needs to be supplied periodically with consumables and packaging materials, including tobacco filler, filter plugs, rolls of cigarette paper, metal foil paper and thermoplastic material, packet blanks and finally coupons and revenue stamps.

To this end, each machine is equipped with at least one sensor monitoring the consumption of the relative materials, as well as a counter positioned at the outfeed stage of the machine and serving to indicate the number of items turned out during the respective production cycle.

Currently, the demands of the market dictate that production be organized in limited runs dedicated in each instance to a given type (brand) of tobacco product, with the result that the machines have to be shut down and the various consumables replaced entirely or in part. Moreover, these systems are subject to somewhat frequent and lengthy stoppages so that scheduled maintenance work can be carried out, and this in turn requires the removal of any unused consumable materials from the machine.

Conventionally, the task of renewing the supply of consumables to the various machines is carried out by production line operators, relying on an approximate and empirical approach that obviously causes the materials in question to be wasted, and especially during the final stage of the production run. This waste of material results in an unwanted overproduction of the particular brand of tobacco product, creating the problem of a stock surplus to the actual requirement, which must then be sold or possibly recycled.

It happens also, in view of the current criteria adopted for the management and supply of materials, that following a production run dedicated to one particular type of product, a relatively lengthy period of time is needed to set up the system in readiness for the manufacture of another type of product, since the materials remaining from the previous run must be replaced with new materials.

The object of the present invention is therefore to overcome the problems mentioned above by seeking to minimize waste.

SUMMARY OF THE INVENTION

The stated object is duly realized, according to the invention, in a method for managing the supply of wrapping and/or additional and/or auxiliary materials in a system for the manufacture of tobacco products including at least one production machine, comprising the steps of programming a nominal target number of products, by way of a master control unit; counting the number of products emerging from the production machine and relaying a corresponding input to the master control unit; presenting inputs to the master control unit indicating the consumption of each type of wrapping and/or additional and/or auxiliary material; processing an output message based at least on the three inputs received and indicating the requirement for at least one predetermined type of wrapping and/or additional and/or auxiliary material to be supplied; sending the processed message to an operator entrusted with the task of replacing the depleted material.

The present invention relates moreover to a device for managing the supply of wrapping and/or additional and/or auxiliary materials in a system for the manufacture of tobacco products.

Such a device comprises a master control unit, a terminal by way of which to preset a nominal target number of products to be manufactured, connected on the output side to the input of the master control unit, a counter registering the number of products emerging from the production machine, connected on the output side to the input of the master control unit, also sensors monitoring the consumption of each type of wrapping and/or additional and/or auxiliary material used by the production machine, connected on the output side to the input of the master control unit.

The master control unit is able to produce an output message processed at least on the basis of the input data received from the counters and the sensors and indicating the requirement for at least one given type of wrapping and/or additional and/or auxiliary material to be supplied, and to this end is connected on the output side to the input of means by which information is passed to an operator entrusted with the task of replacing the depleted material.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
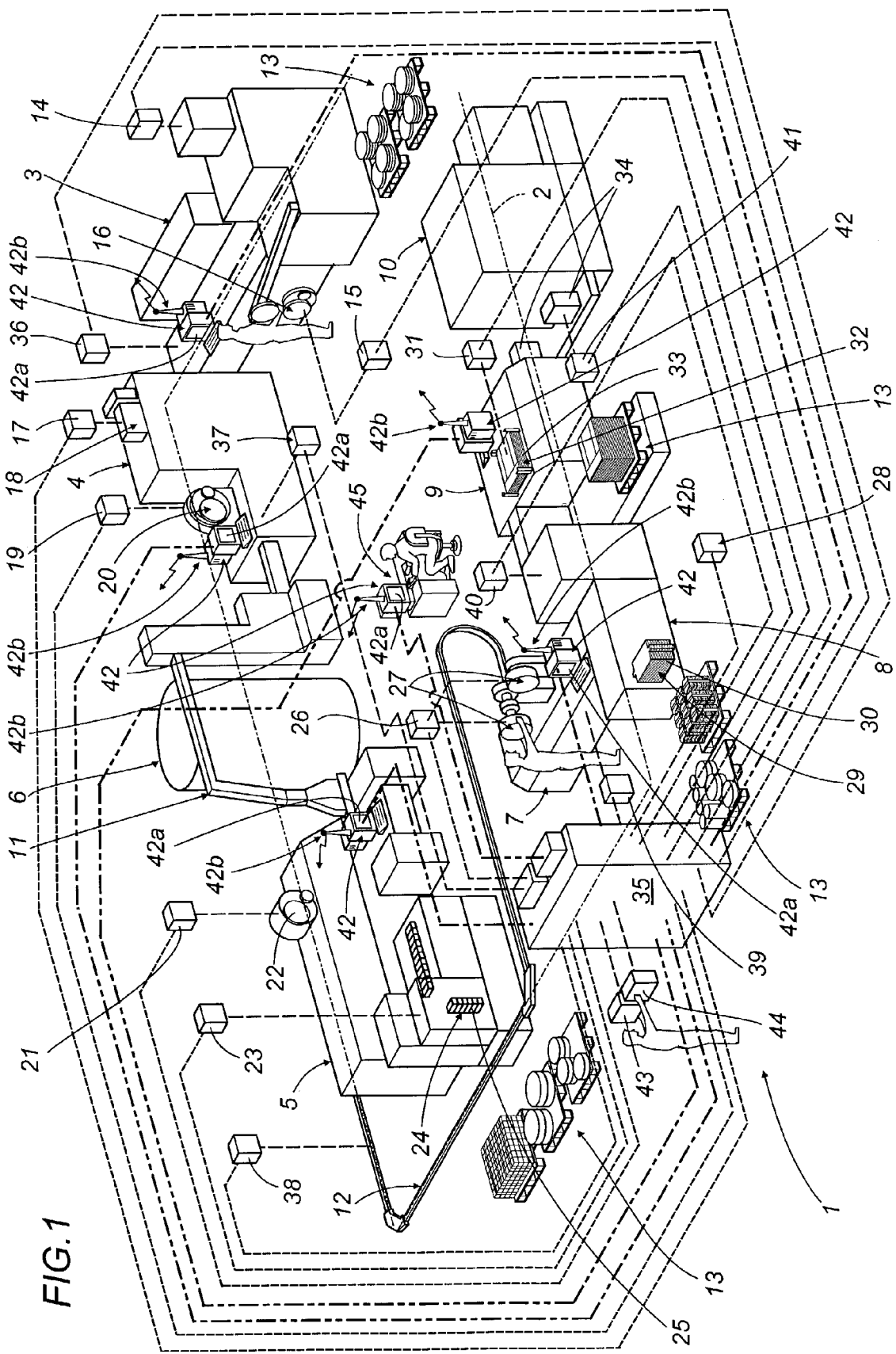
FIG. 1 illustrates the layout of a system for the manufacture of tobacco products, represented schematically in perspective and with certain parts omitted, equipped with a master control device embodied in accordance with the present invention.

Referring to FIG. 1 of the drawings, 1 denotes a system for the manufacture of tobacco products, in its entirety, comprising a plurality of machines linked one to another along a common production line denoted 2. More exactly, and proceeding from the upstream to the downstream end of the line 2, the system 1 incorporates a cigarette maker 3, a filter tip attachment 4, a packer 5 connected to the filter tip attachment 4 by way of a temporary storage unit 6, also a cellophaner 7, a cartoner 8 and a box packer 9 connected on the outfeed side to a palletizer 10.

The various machines 3 . . . 9 are interconnected along the line 2 by means of conveyor devices, of which the conveyor 11 linking the filter tip attachment 4 and the packer 5 and the conveyor 12 linking the packer 5 and the cellophaner 7, in particular, are indicated in FIG. 1.

Also indicated in FIG. 1 are platforms, all of which denoted 13, stationed alongside each of the machines 3 . . . 9 and serving as stands on which to keep an immediate supply of consumable materials, for example rolls, blanks and similar items.

Figure 6:
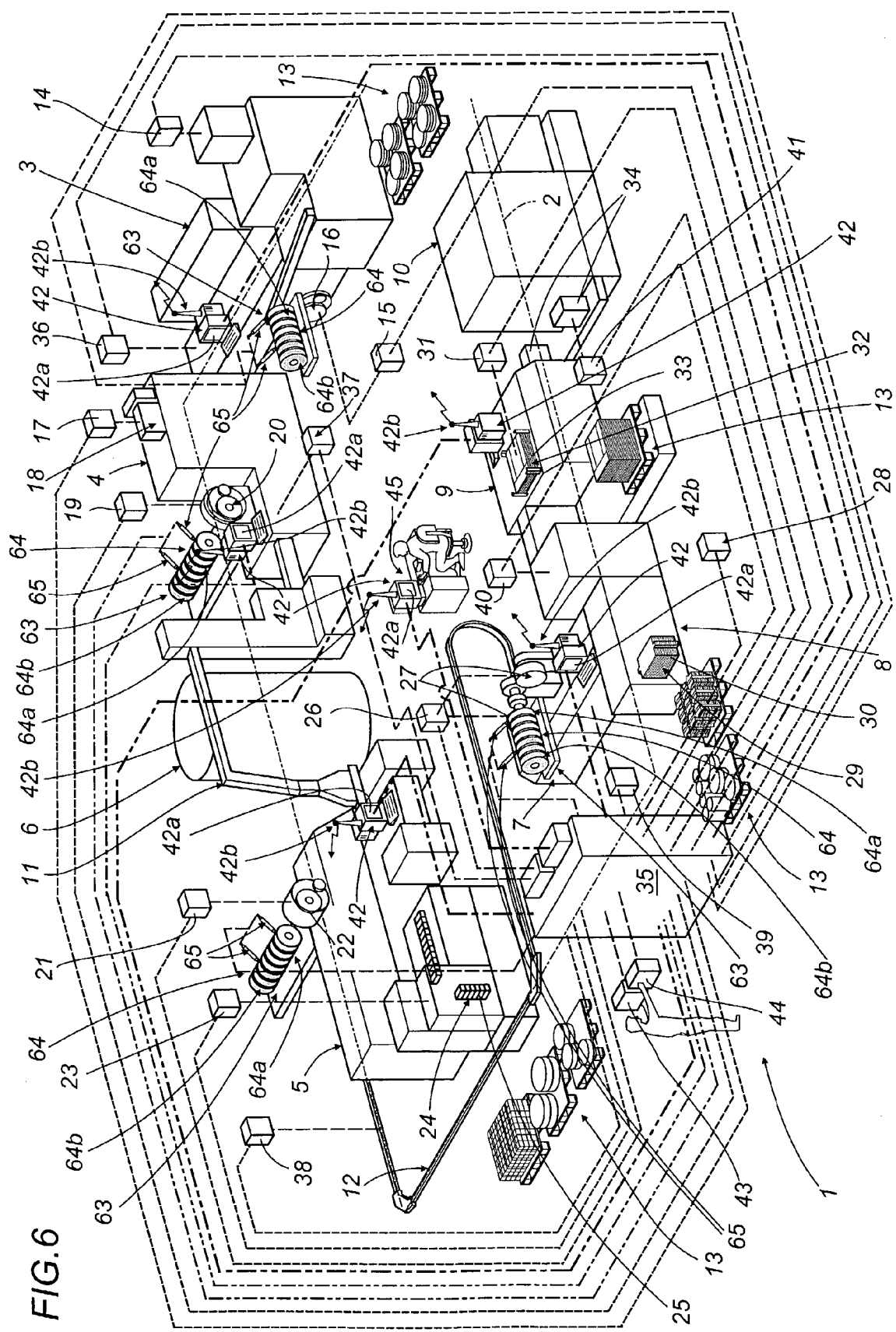
FIG. 6 illustrates the layout of a system as in FIG. 1 for the manufacture of tobacco products, in a second embodiment, represented schematically in perspective and with certain parts omitted.

In the example of FIG. 6, the system further comprises a plurality of magazines, or buffers 63, associated respectively with the various machines 3 . . . 9, serving to hold a given quantity of consumable materials, such as rolls 64, and supply these same materials directly to the machines 3 . . . 9, or in practice to mechanisms by which the rolls 64 are decoiled. More particularly, the magazines 63 are shown associated with the cigarette maker 3, the filter tip attachment 4, the packer 5 and the cellophaner 7, and consist each in a plurality of rolls 64 disposed with axes horizontal and ordered one alongside the next in coaxial alignment.

Associated with each of the various machines 3 . . . 9, and illustrated by relative blocks, are respective sensors able to generate a signal indicating the consumption of the material or materials utilized by the corresponding machine during its operation. In particular, the cigarette maker 3 is equipped with a sensor 14 monitoring the consumption of the shredded tobacco filler utilized in the cigarettes, and a sensor 15 monitoring the consumption of the rolls 16 of strip cigarette paper material.

The filter tip attachment 4 is equipped with a sensor 17 monitoring the consumption of filter plugs, which are loaded into cassettes 18, and a sensor 19 monitoring consumption of the rolls 20 of strip material from which tipping papers are cut.

The packer 5 is equipped with a sensor 21 serving to monitor consumption of the rolls 22 of strip material, typically metal foil paper and the like, used to fashion the internal wrappers of cigarette packets (not shown in FIG. 1), and a sensor 23 monitoring the consumption of stacks 24 of diecut blanks 25 from which the outer wrappers of the cigarette packets are fashioned.

In the event that the packer 5 is of a type designed to manufacture soft packets, the stack 24 of blanks 25 will be replaced by a roll of strip material from which the outer or label wrapper of the soft type packet is fashioned.

The cellophaner 7 is equipped with a sensor 26 monitoring consumption of the rolls 27 of strip material, typically transparent film and the like, from which the overwrappings of cigarette packets are fashioned.

Similarly, the cartoner 8 is equipped with a sensor 28 monitoring the consumption of a stack 29 of diecut blanks 30 formed into cartons (not shown) containing a given number of packets of cigarettes, and the box packer 9 is equipped with a sensor 31 monitoring the consumption of a stack 32 of flat packaging elements 33 erectable into boxes 34 that will contain a plurality of cartons.

In the example of FIG. 6, each of the buffers 63 is equipped with a corresponding sensor capable of indicating the quantity of material contained, for example the number of rolls 64, possibly by way of bar code readers 65.

The outputs of the sensors 14, 15, 17, 19, 21, 23, 26, 28, 31 and 65 are connected to a master control unit 35, which is connected in conventional manner (not indicated) to the respective internal control units (not illustrated in FIG. 1) of the single machines making up the system 1. Also connected to the master control unit 35 will be a plurality of counters, represented by respective blocks, which are able to keep a tally of the number of products emerging from the single machines 3 . . . 9 and apply a corresponding input to the master control unit 35.

More exactly, the cigarette maker 3 is equipped with a counter 36 serving to keep a tally of the cigarette sticks turned out by the machine, the filter tip attachment 4 with a counter 37 serving to keep a tally of the filter cigarettes turned out, and the packer 5 with a counter 38 serving to keep a tally of the rigid or soft packets turned out.

Finally, the cellophaner 7, cartoner 8 and box packer 9 are equipped with relative counters 39, 40 and 41 serving to keep tallies of the overwrapped packets, cartons and boxes 34 turned out.

In the same way as described above with reference to the sensors 14 . . . 31 and the counters 36 . . . 41, the machines 3 . . . 9 are equipped with respective audiovisual information means indicated schematically as blocks denoted 42, connected to the output side of the aforementioned master control unit 35, such as will allow communication with operators minding the system 1 once the necessary processing operations have been performed by the master control unit 35, by way of video means with relative displays 42$a$, or acoustic means with relative sound reproduction equipment (not indicated), or radio or other means of communication utilizing aerials 42$b$ transmitting to headsets worn by the operator, in the manner and following procedures that will shortly be described with reference to FIGS. 2, 3, 4 and 5.

Also connected to the master control unit 35 are a terminal block 43 by way of which to preset a given nominal target number PL of products to be turned out by the system 1 during the production run, a terminal block 44 by way of which to set a critical number PC consisting in a predetermined percentage of the nominal target number PL, and a central monitoring station 45 in receipt of the input data and signals relayed to the master control unit 35 by the sensors 14 . . . 31, the counters 36 . . . 41, and connected to the information means 42.

Figure 2:
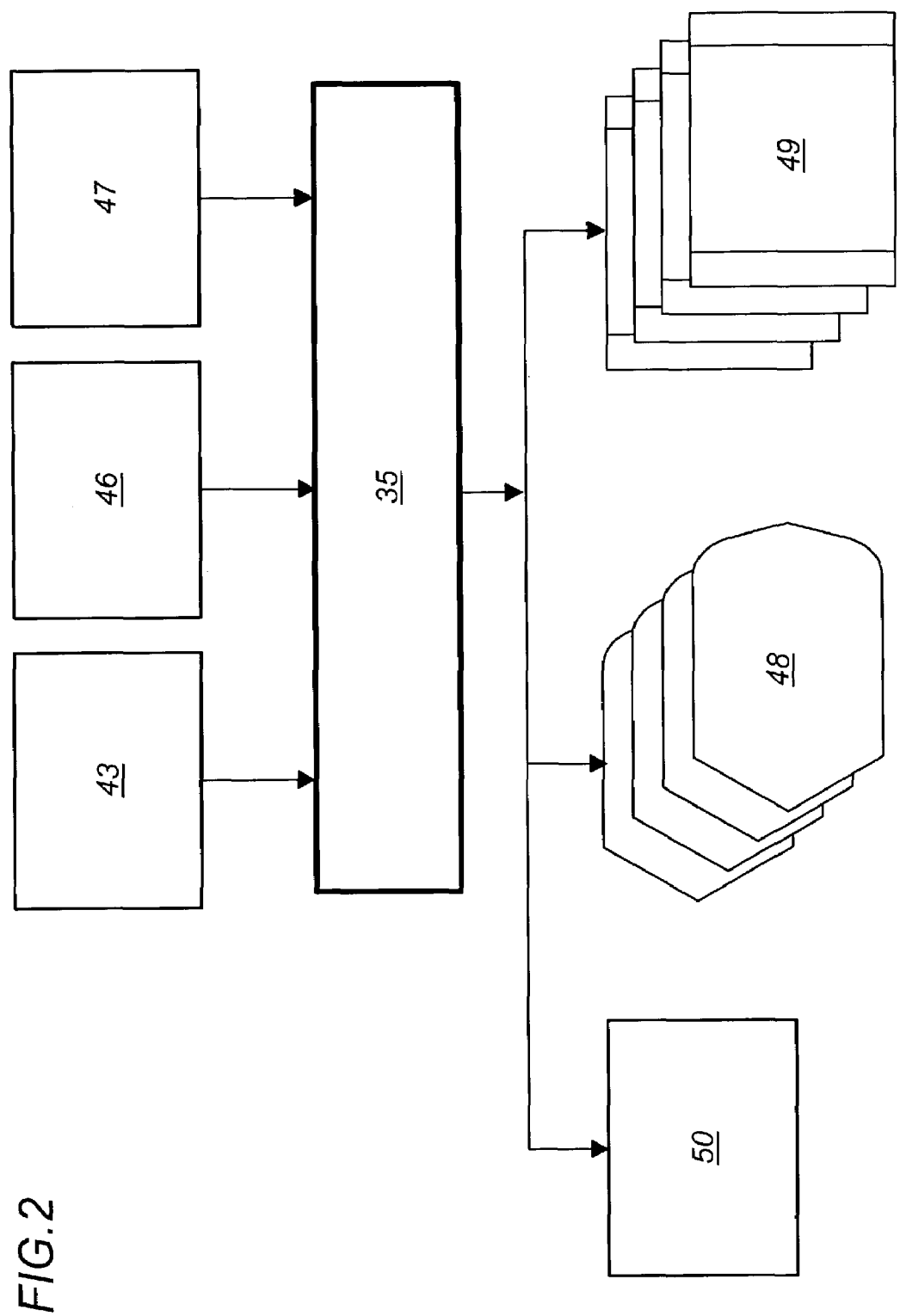
FIG. 2 is a block diagram representing a first preferred embodiment of the master control device illustrated in FIG. 1.

FIG. 2 shows a block diagram reflecting the situation of FIG. 1, but excluding the terminal (not indicated in the diagram) used for presetting the critical number PC. More precisely, the block denoted 35, which represents the master control unit, is connected to the output of the block 43 representing the terminal utilized to preset the nominal target number PL, also to the output of a block 46 in receipt of data returned by at least one of the counters 36 . . . 41, and more exactly by at least one of the more downstream counters on the production line 2, and to the output of a block 47 in receipt of data returned by the sensors 14 . . . 31.

The master control unit 35 is also connected, in this instance on the output side, to a plurality of blocks 48 representing the information means 42, and to a plurality of blocks 49 representing the internal control units of the individual machines making up the system 1. Lastly, the master control unit 35 is connected to a block 50 representing a link with the inventory system of a central store (not illustrated) located remotely from the line 2, where the consumables are kept.

Figure 3:
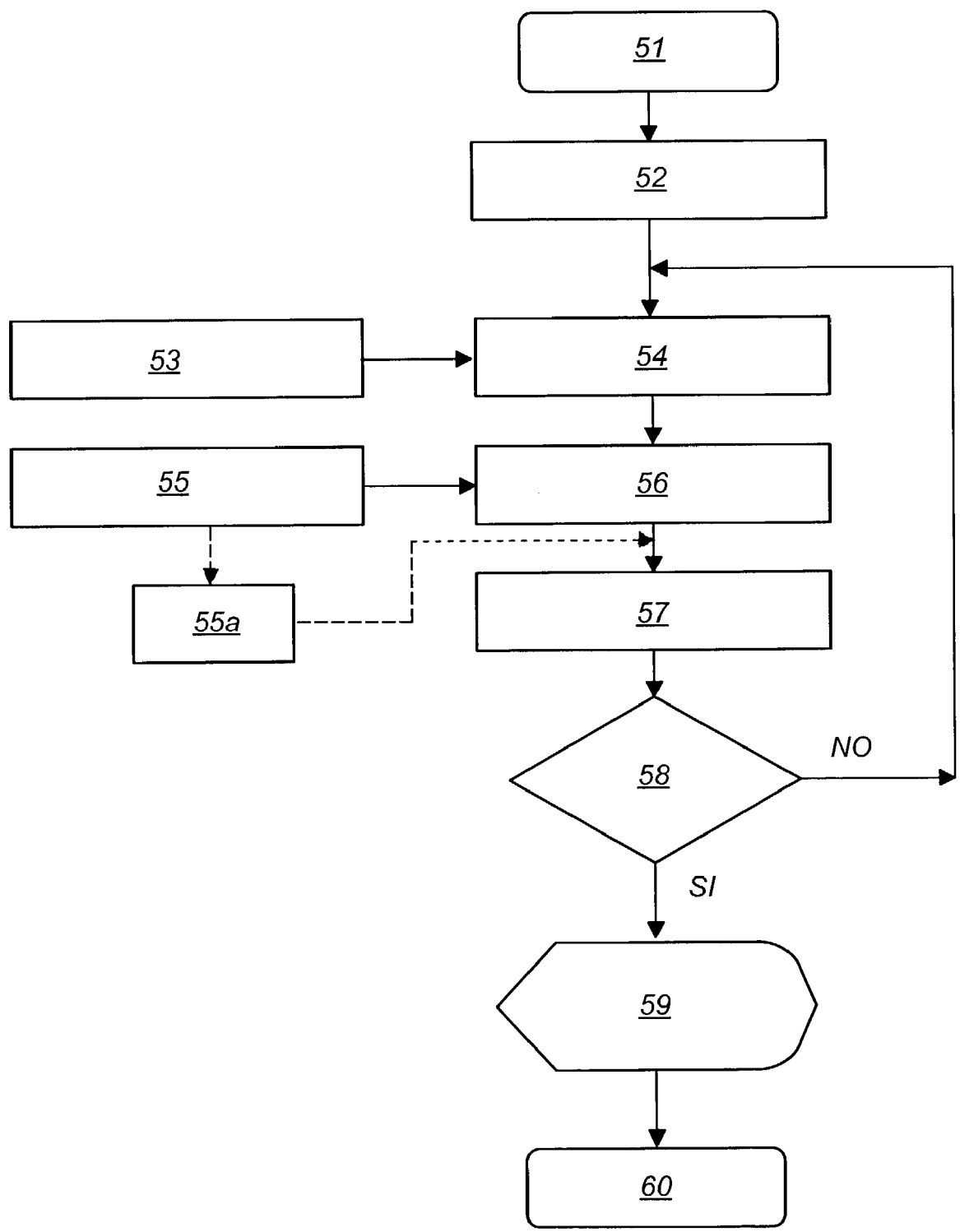
FIG. 3 is a flowchart corresponding to the block diagram of FIG. 2.

To the end of minimizing any waste of consumable materials, for example, each time a change of brand is required, the control unit 35 will proceed, as indicated in the flowchart of FIG. 3, to execute the following succession of steps beginning from an situation represented by the block denoted 51.

The method of managing the supply of wrapping and/or additional and/or auxiliary materials to the system 1 is implemented through a succession of steps, each represented by a respective block in the flowchart of FIG. 3. More particularly, the block denoted 52 represents the step of setting the nominal target number PL of products to be turned out by the system, the selection being made by way of the relative terminal 43.

The block denoted 53 indicates a step whereby the block 46 receives the tally PR of products turned out by the individual machines 3 . . . 9 or at least, as indicated previously, by the last machine 9 of the line.

The block denoted 54 indicates an acquisition step in which the data relative to the tally PR of products is received by the master control unit 35.

The block denoted 55 indicates the acquisition of input data representing the extent to which each type of wrapping and/or additional and/or auxiliary material has been depleted.

The block denoted 56 indicates a step of sending data acquired through block 55, by way of block 47 in FIG. 2, to the master control unit 35.

The block denoted 57 indicates a step in which the control unit 35 processes the data acquired in the above steps.

The decision block denoted 58 indicates the step of determining, on the basis of the acquired input data, whether or not to replenish the supply of at least one type of wrapping and/or additional and/or auxiliary material; a YES outcome will activate the subsequent preparation block 59, which indicates a step of sending a processed message to an operator, consisting in an instruction to replace the now depleted material. The message is conveyed via the information means 42 utilizing the selected method of communication, which might be video 42a, audio (sound reproduction system not illustrated in the drawings) or radio and the like, in this instance transmitted from aerials 42b to a headset worn by the operator.

In the event of a NO decision, the flow reverts to a point downstream of the aforementioned block denoted 52.

The block denoted 60 indicates the completion of the production run, signifying that the system has turned out the nominal target number PL of items.

The function of the blocks 49 in FIG. 2, which represent the internal control units of the single machines 3 . . . 9 making up the system, is to manage a programmed shutdown of the machines, which can be implemented automatically or manually.

By way of the block denoted 50 in FIG. 2, which indicates the interface between the master control unit 35 and the central store where the consumable materials are stocked, the operator will establish the type and quantity of wrapping and/or additional and/or auxiliary materials to be removed, according to the nature of the scheduled brand change.

Importantly, as part of this latter step, the residual quantities of the materials removed from the line will be recorded to enable management of their utilization subsequently in the manufacture of the same brand or of another brand.

Figure 4:
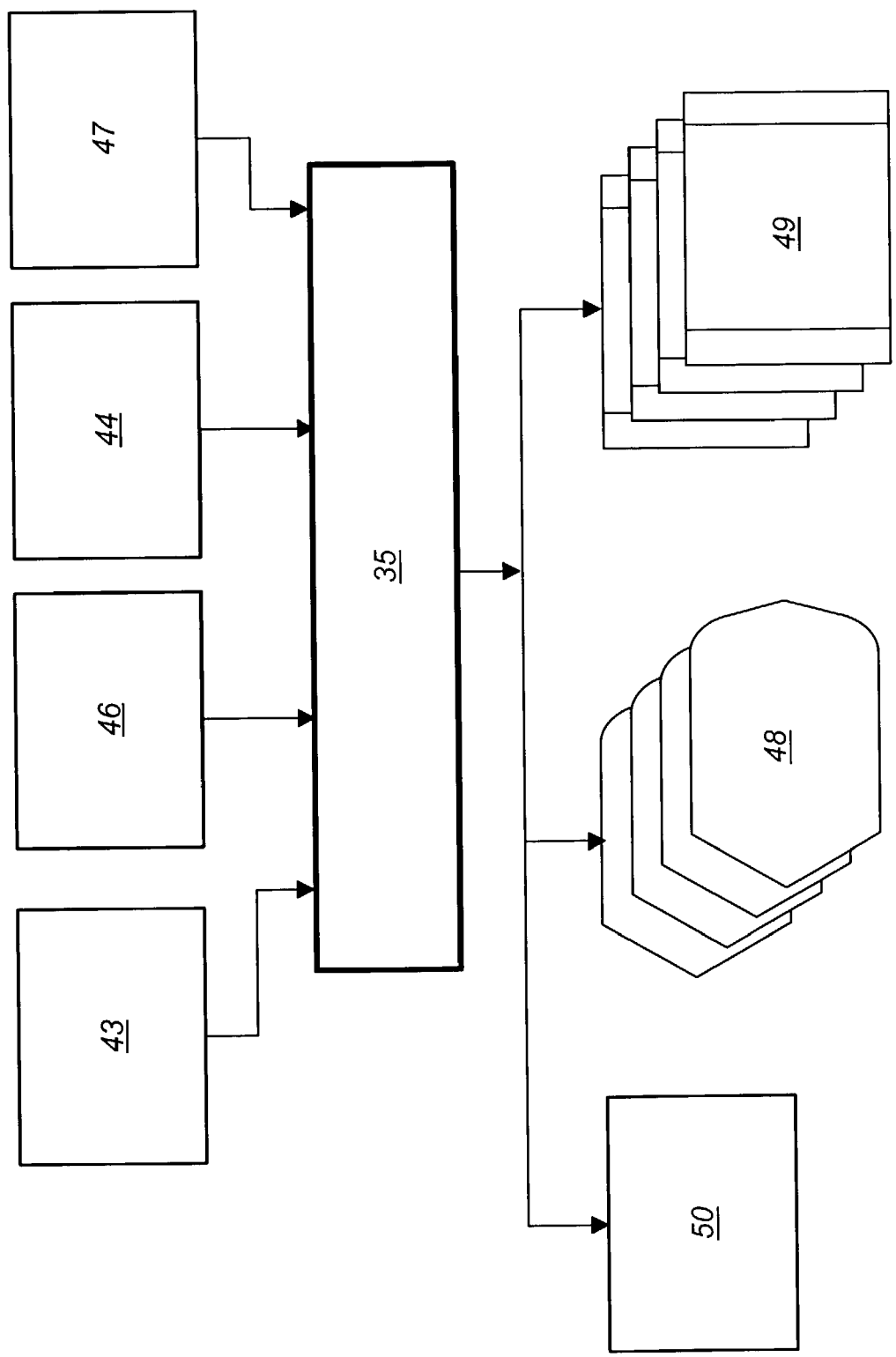
FIG. 4 is a block diagram representing a second preferred embodiment of the master control device illustrated in FIG. 1.
Figure 5:
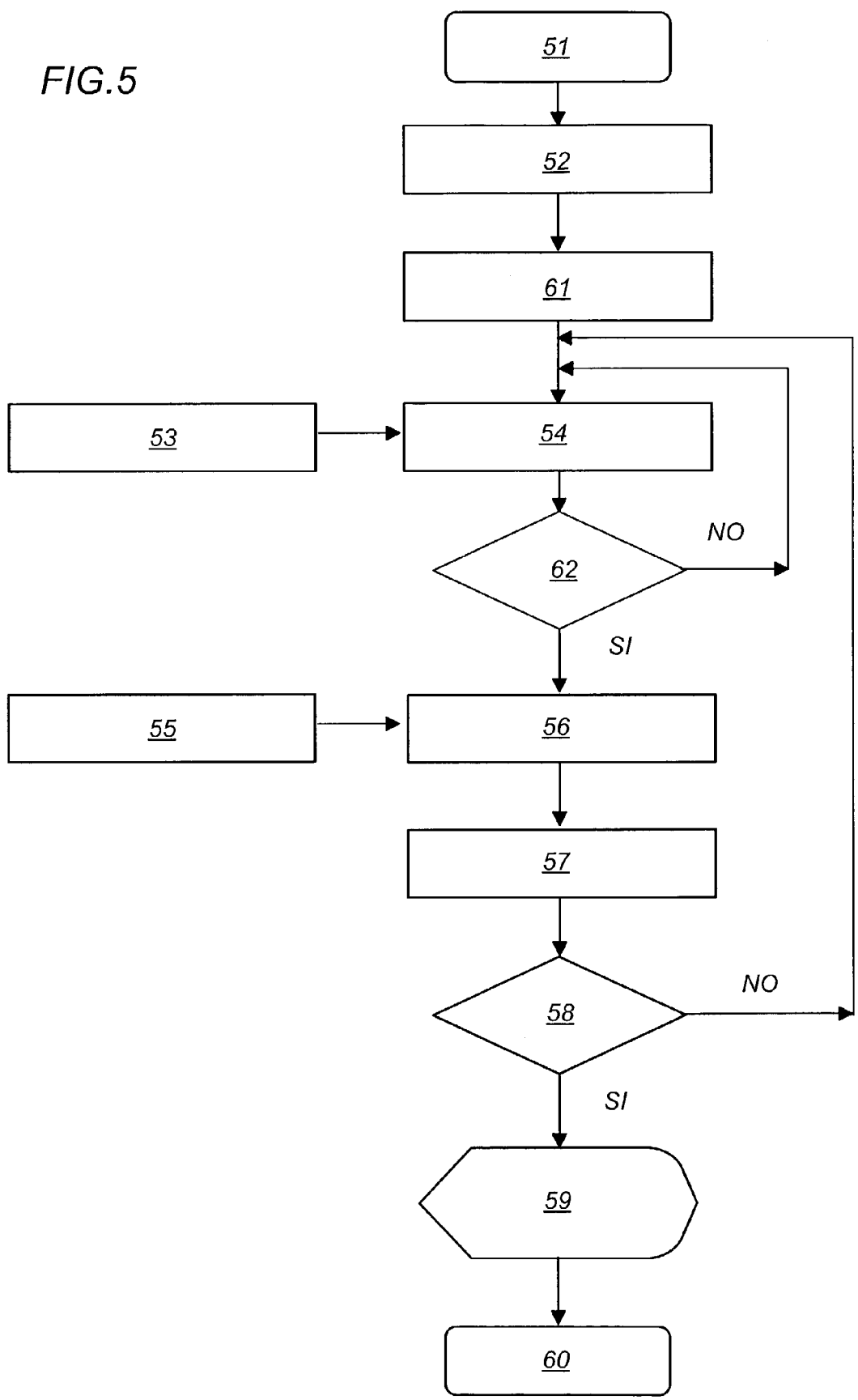
FIG. 5 is a flowchart corresponding to the block diagram of FIG. 4.

In the example of FIGS. 4 and 5, a critical number PC preset by way of a terminal represented by the block denoted 44 constitutes a percentage of the nominal target number PL. More precisely, the block 35 representing the master control unit is also connected to the output of this same block 44, and the method of managing the supply of wrapping and/or additional and/or auxiliary materials to the system 1 is implemented through a succession of steps each represented by a relative block in the flowchart of FIG. 5 which, in contrast to the flowchart of FIG. 3, also comprises a block 61 interposed between blocks 52 and 54 and indicating a step of presetting the critical number PC, which represents a given percentage value of the nominal target number PL, also a further decision block 62 that indicates the step of comparing the value of the critical number PC with the tally PR of items turned out by the system 1.

In the event that the value of PR is less than the value of PC, a NO decision causes the procedure to return to a point immediately downstream of the block denoted 61, whereas if the value of PR is equal to or greater than the value of PC, a YES decision will cause the procedure to advance to the next block 56 in sequence and the remainder of the method is the same as described with reference to FIGS. 2 and 3.

It will be observed that the information means 42 might also be carried into effect by selectively lighting up those areas of the machines 3 . . . 9 in the system 1 where renewal of the depleted material is required.

Referring for example to FIGS. 3 and 6, and to the step of monitoring the consumption of material by each of the machines 3 . . . 9, the block denoted 55a indicates a step of determining the time remaining until the end of the production run, the quantity of material needed to fill the requirement for the run, and the number of products that must be turned out to make up the nominal target number PL.

These items of data appear on the displays 42a of the audiovisual information means 42, whereupon the operator will proceed to supply each of the various machines with the material necessary to make up the predetermined nominal target number PL of products.

The aforementioned sensors 65 inform the operator as to the quantity of material that remains in the buffer 63 serving each machine 3 . . . 9, and the master control unit 35 will compare a signal indicating this same quantity with the signal indicating the quantity needed to make up the programmed nominal target number PL of products.

The data relative to each machine 3 . . . 9 will be dependent on a number of factors, for example the position of the machine on the production line, and the effective quantities of products finished or still in process relative to each of the single machines.

The result of the aforementioned comparison will dictate the course of action taken by the operator in terms of servicing the buffers 63, especially if the signal from the sensors 65 should indicate that the number of rolls 64 required for the machine 3 . . . 9 to complete the production run is greater than the number of rolls that can be held by the buffer 63; in this instance the operator proceeds to replenish the supply with rolls specific to the brand still in production, denoted 64a in FIG. 6, as soon as there is room in the relative buffer 63. Should the signal from the sensors 65 indicate that the number of rolls required for the machine 3 . . . 9 to complete the production run is less than or equal to the number of rolls that can be held by the buffer 63, the operator will proceed to top up the supply, as soon as there is room in the buffer 63, with rolls specific to the brand next in production, which are denoted 64*b*.

Accordingly, the duration of down time occasioned by a changeover from one production run to another can be markedly reduced, at least for the machines mentioned above.

What is claimed:

1. A method for managing a supply of at least one of wrapping, additional or auxiliary material(s) in a system for manufacturing tobacco products, including at least one production machine, comprising:

programming a nominal target number of products to be turned out by the machine during the course of the relative production run, by way of a master control unit;

counting a number of products emerging from the production machine and relaying a corresponding input to the master control unit;

presenting inputs to the master control unit indicating a consumption of each type of wrapping, additional or auxiliary material(s);

processing an output message based at least on the inputs received and indicating at least a requirement for at least one predetermined type of the wrapping, additional or auxiliary material(s) to be supplied;

sending the processed message to an operator entrusted with the task of replacing a depleted quantity of the wrapping, additional or auxiliary material(s);

removing the wrapping, additional or auxiliary material(s) as appropriate for changeover to another brand of product;

labeling the removed material(s) with information indicating the residual quantity, in anticipation of their subsequent utilization.

2. A method as in claim 1, comprising the steps of:

comparing the nominal target number of products with the number of products emerging from the production machine;

causing the master control unit to output a message indicating a condition of parity between the nominal target number of products and the number of products emerging from the machine;

sending the message to a control module connected to the master control unit in such a way as to bring about a programmed step of shutting down the machine.

3. A method as in claim 2, wherein the control module operates by piloting the master control unit to shut down the machine automatically.

4. A method as in claim 2, wherein the control module operates by instructing a production line operator to shut down the machine.

5. A method as in claim 4, wherein the step of sending the message to the operator is implemented utilizing visual and/or acoustic information means.

6. A method as in claim 4, wherein the step of sending the message to the operator is implemented utilizing telephone and/or radio communication.

7. A method as in claim 4, wherein the step of sending the message to the operator is implemented by selectively illuminating areas of the machine where replacement of the depleted material is required.

8. A method as in claim 1, applicable to a system comprising a plurality of production machines, wherein the step of counting the number of emerging products is implemented at least at an outfeed of a final machine in the system, and the programmed nominal target number represents a number of products turned out by that final machine.

9. A method as in claim 8, further comprising, implemented in conjunction with the step of indicating the consumption of each type of material by the relative machine, of:

determining a time required by each machine to complete the production run;

determining a quantity of material needed to complete the production run;

determining a number of products that must be turned out to match the programmed nominal target number.

10. A method as in claim 9, comprising the step of comparing a signal indicating the quantity of material needed to complete the production run with a signal indicating the quantity of that material contained in a relative buffer.

11. A method as in claim 10, comprising a step, dictated by the result of the comparison, of not supplying material, or supplying material of the type used in the current production run, or supplying material of a type used in a different and predetermined production run.

12. A method as in claim 1, further comprising an acquisition step whereby data relative to the consumption of materials and messages relative to the replacement of depleted materials are routed to a central monitoring station manned by a production line operator.

13. A method for managing a supply of at least one of wrapping, additional or auxiliary material(s) in a system for manufacturing tobacco products, including at least one production machine, comprising:

programming a nominal target number of products to be manufactured, by way of a master control unit;

programming a critical number representing a given percentage value of the nominal target number, by way of the master control unit;

counting a number of products emerging from the production machine and relaying a corresponding input to the master control unit;

comparing the number of products emerging from the machine with the critical number;

presenting inputs to the master control unit at least when a condition of parity is established between the number of products emerging from the machine and the critical number, indicating a consumption of each type of wrapping, additional or auxiliary material(s);

processing an output message indicating at least a requirement for a given type of the wrapping, additional or auxiliary material(s) to be supplied in order to reach the nominal target number of products;

sending the processed message to an operator entrusted with the task of replacing a depleted quantity of said wrapping, additional or auxiliary material(s);

removing the wrapping, additional or auxiliary material(s) as appropriate for changeover to another brand of product;

labeling the removed material(s) with information indicating a residual quantity, in anticipation of their subsequent utilization.

14. A device for managing a supply of at least one of wrapping, additional or auxiliary material(s) in a system for manufacturing tobacco products, including at least one production machine, comprising a master control unit, a terminal by way of which to preset a nominal target number of products to be turned out by the machine during a relative production run, connected on an output side to an input side of the master control unit, a counter registering a number of products emerging from the production machine, connected on an output side to the input side of the master control unit, also sensor means monitoring a consumption of each type of wrapping, additional or auxiliary material(s) used by the production machine, connected on an output side to the input side of the master control unit; the master control unit being able to produce an output message processed at least on a basis of the received input data and indicating at least a requirement for at least one given type of wrapping, additional or auxiliary material(s) to be supplied, and the master control unit being connected on an output side to an input of means by which information is passed to an operator entrusted with the task of replacing a depleted quantity of said wrapping, additional or auxiliary material(s); the device further comprising;

- means for removing the wrapping, additional or auxiliary material(s) as appropriate for changeover to another brand of product;
- means for labeling the removed material(s) with information indicating a residual quantity, in anticipation of their subsequent utilization.

15. A device as in claim 14, comprising a second terminal by way of which to preset a critical number consisting in a given percentage value of the nominal target number, connected on an output side to the input side of the master control unit.

16. A device as in claim 14, wherein the system comprises a plurality of production machines, and a number of products emerging at least from a final machine in the system is recorded by a counter associated with the outfeed of the final machine.

17. A device as in claim 14, wherein each production machine is equipped with at least one buffer containing a respective material, further comprising sensor means associated with the buffer and serving to monitor the quantity of material contained therein, also means by which to compare a signal indicating the quantity of material contained in the buffer with a signal indicating the quantity of the selfsame material needed by the machine to complete the respective production run.

18. A device as in claim 14 implementing a method as in claim 1, wherein information is passed to the operator by way of means using at least one of optical, acoustic or radio telephone communication, or by selectively illuminating areas of the machine where replacement of the depleted material is required.

* * * * *